United States Patent
Kobayashi et al.

(10) Patent No.: US 6,373,625 B1
(45) Date of Patent: *Apr. 16, 2002

(54) METHOD, APPARATUS, AND SYSTEM FOR OPTICAL AMPLIFICATION

(75) Inventors: Taiki Kobayashi, Kawasaki; Hiroyuki Itou, Sapporo, both of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/431,208

(22) Filed: Nov. 1, 1999

(30) Foreign Application Priority Data

Mar. 18, 1999 (JP) .......................................... 11-074465

(51) Int. Cl.$^7$ ................................................ H01S 3/00
(52) U.S. Cl. ............................ 359/341.41; 359/337.12; 359/341.33
(58) Field of Search ................................. 359/337, 341, 359/337.1, 337.11, 337.12, 337.13, 337.2, 337.21, 337.22, 337.3, 337.4, 337.5, 341.1, 341.2, 341.3, 341.31, 341.32, 341.33, 341.4, 341.41, 341.42, 341.43, 341.44, 341.5

(56) References Cited

U.S. PATENT DOCUMENTS

| | | | | |
|---|---|---|---|---|
| 5,664,131 A | * | 9/1997 | Sugiya | 359/341 |
| 5,710,660 A | * | 1/1998 | Yamamoto et al. | 359/341 |
| 5,745,283 A | * | 4/1998 | Inagaki et al. | 359/341 |
| 5,764,404 A | * | 6/1998 | Yamane et al. | 359/341 |
| 5,859,938 A | * | 1/1999 | Nabeyama et al. | 385/24 |
| 5,870,217 A | * | 2/1999 | Itou et al. | 359/179 |
| 5,907,429 A | * | 5/1999 | Sugata | 359/341 |
| 5,909,305 A | * | 6/1999 | Kinoshita | 359/341 |
| 5,912,760 A | * | 6/1999 | Sugiya | 359/341 |
| 5,930,030 A | * | 7/1999 | Scifres | 359/341 |
| 5,963,361 A | * | 10/1999 | Taylor et al. | 359/337 |
| 5,966,236 A | * | 10/1999 | Okuno | 359/337 |
| 5,995,274 A | * | 11/1999 | Sugaya et al. | 359/337 |
| 5,995,276 A | * | 11/1999 | Tajima et al. | 359/341 |
| 6,016,218 A | * | 1/2000 | Jo et al. | 359/341 |
| 6,025,947 A | * | 2/2000 | Sugaya et al. | 359/160 |
| 6,038,061 A | * | 3/2000 | Sugaya | 359/337 |
| 6,055,092 A | * | 4/2000 | Sugaya | 359/337 |
| 6,067,187 A | * | 5/2000 | Onaka et al. | 359/341 |
| 6,072,601 A | * | 6/2000 | Toyohara | 358/484 |
| 6,078,422 A | * | 6/2000 | Kosaka et al. | 359/341 |
| 6,091,539 A | * | 7/2000 | Kosaka | 359/341 |
| 6,111,688 A | * | 8/2000 | Kobayashi et al. | 359/341 |
| 6,151,158 A | * | 11/2000 | Takeda et al. | 359/341 |
| 6,169,615 B1 | * | 1/2001 | Shirai | 359/124 |

FOREIGN PATENT DOCUMENTS

| | | | | |
|---|---|---|---|---|
| JP | 9-98136 | | 4/1997 | ........... H04B/10/17 |
| JP | 09098136 | * | 4/1997 | ........... H04B/10/17 |
| JP | 11121849 | * | 4/1997 | ............. H01S/3/10 |
| JP | 10-12954 | | 1/1998 | ............. H01S/3/10 |
| JP | 11-121849 | | 4/1999 | ............. H01S/3/10 |

* cited by examiner

Primary Examiner—Thomas H. Tarcza
Assistant Examiner—Deandra M. Hughes
(74) Attorney, Agent, or Firm—Staas & Halsey LLP

(57) ABSTRACT

An optical amplifying module having an internal pumping source is provided. WDM signal light obtained by wavelength division multiplexing a plurality of optical signals allocated to different wavelength channels is supplied to the optical amplifying module. An output power from the internal pumping source is adjusted so that the optical amplifying module provides a gain for the WDM signal light. A booster module having an external pumping source for supporting the gain is connected to the optical amplifying module. An output power from the external pumping source is set according to the number of channels of the WDM signal light. This method allows easy response to a change in the number of channels of the WDM signal light.

64 Claims, 9 Drawing Sheets

METHOD, APPARATUS, AND SYSTEM FOR OPTICAL AMPLIFICATION

BACKGROUND OF THE INVENTION

1. Field of the Invention

The present invention relates to a method, apparatus, and system for optical amplification, and more particularly to a method, apparatus, and system for optical amplification suitable for WDM signal light obtained by wavelength division multiplexing a plurality of optical signals allocated to different wavelength channels.

2. Description of the Related Art

An optical communication system using an optical fiber transmission line is used to transmit a relatively large amount of information. A low-loss (e.g., 0.2 dB/km) optical fiber has already been produced and is being used as the optical fiber transmission line. In addition, an optical amplifier for compensating for loss in the optical fiber transmission line is used to allow long-haul transmission.

A related art optical amplifier includes an optical amplifying medium pumped by pump light to provide a gain band. The optical amplifying medium and the pump light are selected so as to provide a gain band including the wavelength of signal light to be amplified. As a result, the signal light is amplified during propagation in the optical amplifying medium being pumped. For example, an erbium doped fiber amplifier (EDFA) includes an erbium doped fiber (EDF) as the optical amplifying medium, and a pumping light source for pumping the EDF. The pumping source supplies pump light having a predetermined wavelength to the EDF. By presetting the wavelength of the pump light within a 0.98 µm band or 1.48 µm band, a gain band including a wavelength band of 1.55 µm can be obtained. As a result, signal light having a wavelength band of 1.55 µm is amplified.

Another type of the related art optical amplifier has a semiconductor chip as the optical amplifying medium. In this case, pumping is performed by injecting an electric current into the semiconductor chip.

As a technique for increasing a transmission capacity by a single optical fiber, wavelength division multiplexing (WDM) is known. In a system adopting WDM, a plurality of optical carriers having different wavelengths are individually modulated by data. Each modulated carrier provides one channel of a WDM system for transmitting optical signals. These optical signals (i.e., the modulated carriers) are wavelength division multiplexed by an optical multiplexer to obtain WDM signal light. The WDM signal light thus obtained is transmitted through an optical fiber transmission line to a receiving end. At the receiving end, the WDM signal light is separated into individual optical signals by an optical demultiplexer. Then, the original data can be detected according to these individual optical signals. Accordingly, by applying WDM, the transmission capacity in a single optical fiber can be increased according to the number of WDM channels.

In the case that an optical amplifier is inserted in a transmission line of an optical communication system adopting WDM, a transmission distance is limited by the wavelength characteristic of gain (wavelength dependence of gain) which is represented by a gain tilt or gain deviation. In an EDFA, for example, it is known that a gain tilt is produced at wavelengths near 1.55 µm and that this gain tilt varies with the total input power of signal light to the EDFA and the power of pump light.

Known is an optical amplifier for optical amplification which can maintain the wavelength characteristic of gain constant and obtain a wide input dynamic range. This optical amplifier includes first and second optical amplifying sections and a variable optical attenuator optically connected between the first and second optical amplifying sections. Automatic gain control (AGC) is applied to each of the first and second optical amplifying sections, thereby maintaining constant the wavelength characteristic of gain of each of the first and second optical amplifying sections. Further, automatic output level control (ALC) is performed by using the variable optical attenuator to thereby obtain a wide input dynamic range. That is, the output level of the second optical amplifying section is maintained constant irrespective of the input level of the first optical amplifying section, so that the input dynamic range of this optical amplifier is widened.

In such an optical amplifier, the attenuation of the variable optical attenuator is controlled so that the power per channel of WDM signal light to be supplied to the second optical amplifying section becomes constant, for example. Further, the output power of an internal pumping source in the second optical amplifying section is controlled to maintain the gain constant. It is known that if the number of channels of WDM signal light to be amplified changes or is modified, the power of a pumping source for obtaining a constant gain increases with an increase in total power of light to be amplified. Owing to this fact, the output power of the internal pumping source may fall outside of an adjustable range. For example, when the number of channels of WDM signal light to be amplified increases in concert with system upgrading, there is a possibility that the output power of the internal pumping source may exceed the adjustable range. However, the related art method cannot easily respond to such a change in the number of channels of WDM signal light.

SUMMARY OF THE INVENTION

It is therefore an object of the present invention to provide a method, apparatus, and system for optical amplification which can easily respond to a change in the number of channels of WDM signal light.

Other objects of the present invention will become apparent from the following description.

In accordance with a first aspect of the present invention, there is provided a method for optical amplification. An optical amplifying module having an internal pumping source is provided. WDM signal light obtained by wavelength division multiplexing a plurality of optical signals allocated to different wavelength channels is supplied to the optical amplifying module. An output power from the internal pumping source is adjusted so that the optical amplifying module provides a gain for the WDM signal light. A booster module having an external pumping source for supporting the gain is connected to the optical amplifying module. An output power from the external pumping source is set according to the number of channels of the WDM signal light.

According to this method, although the number of channels of the WDM signal light has changed, the output power from the external pumping source is set according to the number of channels, thereby supporting the gain given to the WDM signal light by the optical amplifying module. Accordingly, this method can easily respond to a change in the number of channels of the WDM signal light, thus achieving one of the objects of the present invention.

Preferably, the power per channel of the WDM signal light to be supplied to the optical amplifying module is maintained constant. In this case, the power (e.g., total power) of the WDM signal light to be supplied to the optical amplifying module may be detected and the number of channels of the WDM signal light may be obtained according to the power detected above.

Preferably, the gain of the optical amplifying module is detected, and the output power from the internal pumping source is controlled so that the gain detected is maintained constant. The adjustable range of the output power from the internal pumping source is predetermined according to the capacity of the internal pumping source. On the other hand, an optimum output power from the internal pumping source for maintaining the gain constant increases with an increase in the number of channels of WDM signal light to be amplified. Accordingly, by applying the present invention, such control for maintaining the gain constant can be easily performed.

In accordance with a second aspect of the present invention, there is provided a method comprising the steps of (a) providing an optical amplifying module having an internal pumping source; (b) supplying signal light to the optical amplifying module; (c) adjusting an output power from the internal pumping source so that the optical amplifying module provides a gain for the signal light; (d) connecting a booster module having an external pumping source to the optical amplifying module; and (e) setting an output power from the external pumping source according to the power of the signal light.

In this method, the signal light to which the gain is provided by the optical amplifying module is not limited to WDM signal light. Also in the case that the signal light is an optical signal of only one channel, there is a possibility that the output power from the internal pumping source may fall outside the adjustable range because of a change in power of the optical signal. Accordingly, by setting the output power from the external pumping source according to the power of the signal light, the output power can easily respond to a change in power of an optical signal to be amplified.

In accordance with a third aspect of the present invention, there is provided an apparatus comprising an optical amplifying module having an internal pumping source, to which WDM signal light obtained by wavelength division multiplexing a plurality of optical signals allocated to different wavelength channels is supplied; an adjusting unit for adjusting an output power from the internal pumping source so that the optical amplifying module provides a gain for the WDM signal light; and a booster module having an external pumping source for supporting the gain, the booster module being connectable to the optical amplifying module; an output power from the external pumping source being set according to the number of channels of the WDM signal light. According to the third aspect of the present invention, it is possible to provide a suitable apparatus for carrying out the method according to the first aspect of the present invention.

In accordance with a fourth aspect of the present invention, there is provided a system comprising an optical fiber transmission line and at least one optical repeater arranged along the optical fiber transmission line. Each optical repeater may include the apparatus according to the third aspect of the present invention. According to the fourth aspect of the present invention, it is possible to provide a suitable system for carrying out the method according to the first aspect of the present invention.

In accordance with a fifth aspect of the present invention, there is provided an apparatus comprising a front-stage optical amplifying section and a rear-stage optical amplifying section each for providing a gain to WDM signal light obtained by wavelength division multiplexing a plurality of optical signals allocated to different wavelength channels; a variable attenuator optically connected between the front-stage optical amplifying section and the rear-stage optical amplifying section; a circuit for controlling the variable attenuator so that the power per channel of the WDM signal light to be supplied to the rear-stage optical amplifying section is maintained constant; and a booster module having an external pumping source for supporting the gain in the rear-stage optical amplifying section; an output power from the external pumping source being set according to the number of channels of the WDM signal light.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
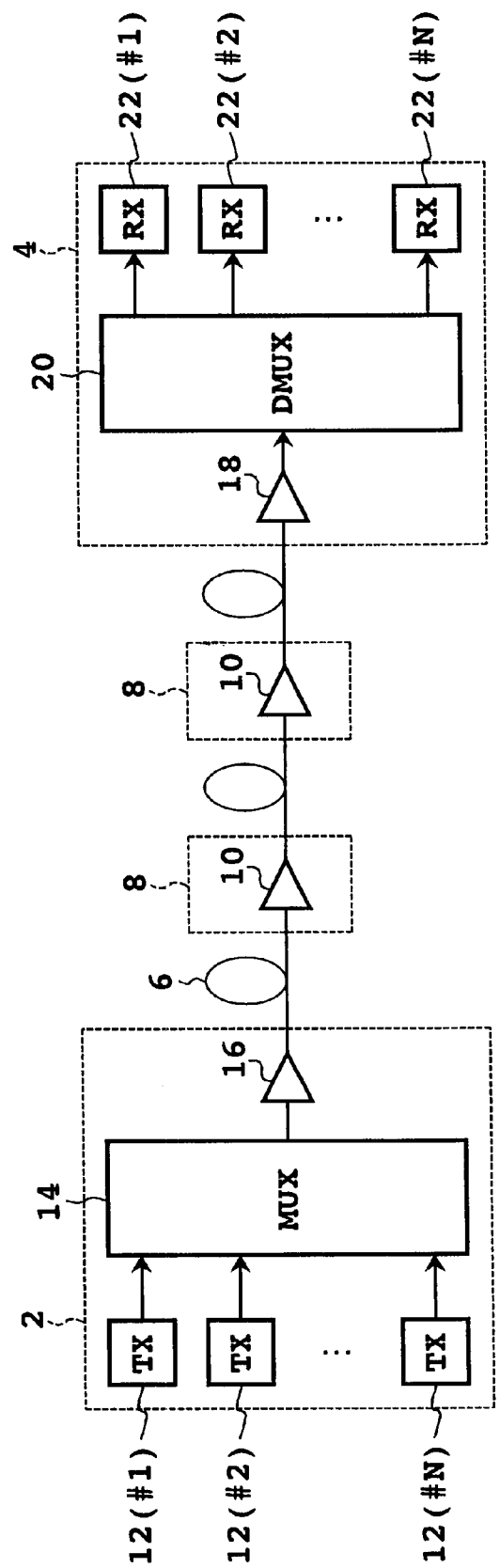
FIG. 1 is a block diagram showing a preferred embodiment of the system according to the present invention.

Some preferred embodiments of the present invention will now be described in detail with reference to the attached drawings. Throughout the drawings, the same reference numerals denote the same elements.

FIG. 1 is a block diagram showing a preferred embodiment of the optical fiber communication system according to the present invention. This system includes a first terminal station 2, a second terminal station 4, an optical fiber transmission line 6 connecting the terminal stations 2 and 4, and a plurality of (two in this preferred embodiment) optical repeaters 8 arranged along the optical fiber transmission line 6. Each optical repeater 8 includes an optical amplifier 10 optically connected to the optical fiber transmission line 6. While the two optical repeaters 8 are shown in FIG. 1, two or more optical repeaters may be used, depending on parameters of system design. Further, a single optical repeater may be used in some system.

The first terminal station 2 includes a plurality of optical transmitters (TX) 12(#1) to 12(#N) for respectively outputting a plurality of optical signals having different wavelengths, an optical multiplexer (MUX) 14 for wavelength division multiplexing the optical signals output from the optical transmitters 12(#1) to 12(#N) to obtain WDM signal light, and an optical amplifier (postamplifier) 16 for amplifying the WDM signal light obtained from the optical multiplexer 14 to output resultant amplified WDM signal light to the optical fiber transmission line 6.

The second terminal station 4 includes an optical amplifier (preamplifier) 18 for amplifying the WDM signal light from the optical fiber transmission line 6, an optical demultiplexer (DMUX) 20 for separating resultant amplified WDM signal light output from the optical amplifier 18 into a plurality of optical signals, and a plurality of optical receivers (RX) 22(#1) to 22(#N) for respectively receiving the optical signals from the optical demultiplexer 20.

With this system configuration, loss of the WDM signal light can be compensated by at least an optical repeater or repeaters 8 arranged along the optical fiber transmission line 6, thereby allowing long-haul transmission. Furthermore, the optical signals of plural channels are transmitted by the optical fiber transmission line 6, thereby increasing a transmission capacity.

Figure 2:
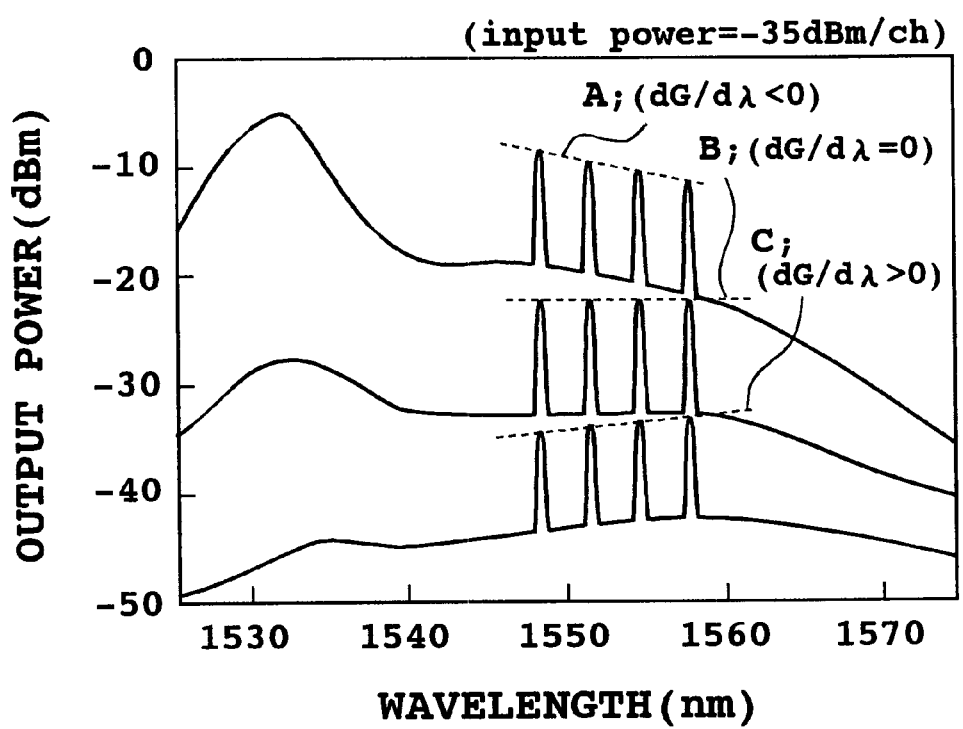
FIG. 2 is a graph for illustrating gain tilt in an EDF.

FIG. 2 is a graph for illustrating a gain tilt occurring in an optical amplifier. More specifically, there are shown in FIG. 2 the spectra of output light when WDM signal light based on optical signals of four channels (having wavelengths of 1548, 1551, 1554, and 1557 nm) having the same power (−35 dBm/ch) is input into an EDFA (erbium doped fiber amplifier). In FIG. 2, the vertical axis represents output power (dBm), and the horizontal axis represents wavelength (nm).

The spectrum shown by A corresponds to the case where the power of pump light is relatively high, causing a negative gain tilt in a band of about 1540 to 1560 nm. That is, the negative gain tilt is a gain tilt such that the gain decreases with an increase in wavelength, and the derivative of gain (G) with respect to wavelength ($\lambda$) is negative ($dG/d\lambda<0$).

The spectrum shown by C corresponds to the case where the power of pump light is relatively low, causing a positive gain tilt in a band of about 1540 to 1560 nm. That is, the positive gain tilt is a gain tilt such that the gain increases with an increase in wavelength, and the derivative of gain (G) with respect to wavelength ($\lambda$) is positive ($dG/d\lambda>0$).

The spectrum shown by B corresponds to the case where the power of pump light is optimum so that no gain tilt is induced or the gain tilt becomes flat in a band of about 1540 to 1560 nm, and the derivative of gain (G) with respect to wavelength ($\lambda$) is zero ($dG/d\lambda=0$).

Each spectrum has such a shape that four sharp spectra corresponding to the optical signals of the four channels are superimposed on a gentle spectrum of ASE (amplified spontaneous emission). It is known that the wavelength characteristic of gain for a small signal depends on an ASE spectrum.

In the case that a plurality of optical amplifiers are cascaded as shown in FIG. 1, a gain tilt occurring in each optical amplifier is accumulated over the optical fiber transmission line, causing a degradation in signal-to-noise ratio in a low-level channel or a degradation in waveform due to nonlinear effects or the like in a high-level channel, so that a transmission distance for obtaining a required receiving sensitivity is limited. Accordingly, in this kind of system, it is greatly effective in increasing a transmission distance to perform a control such that the gain tilt in each optical amplifier becomes flat.

Figure 3:
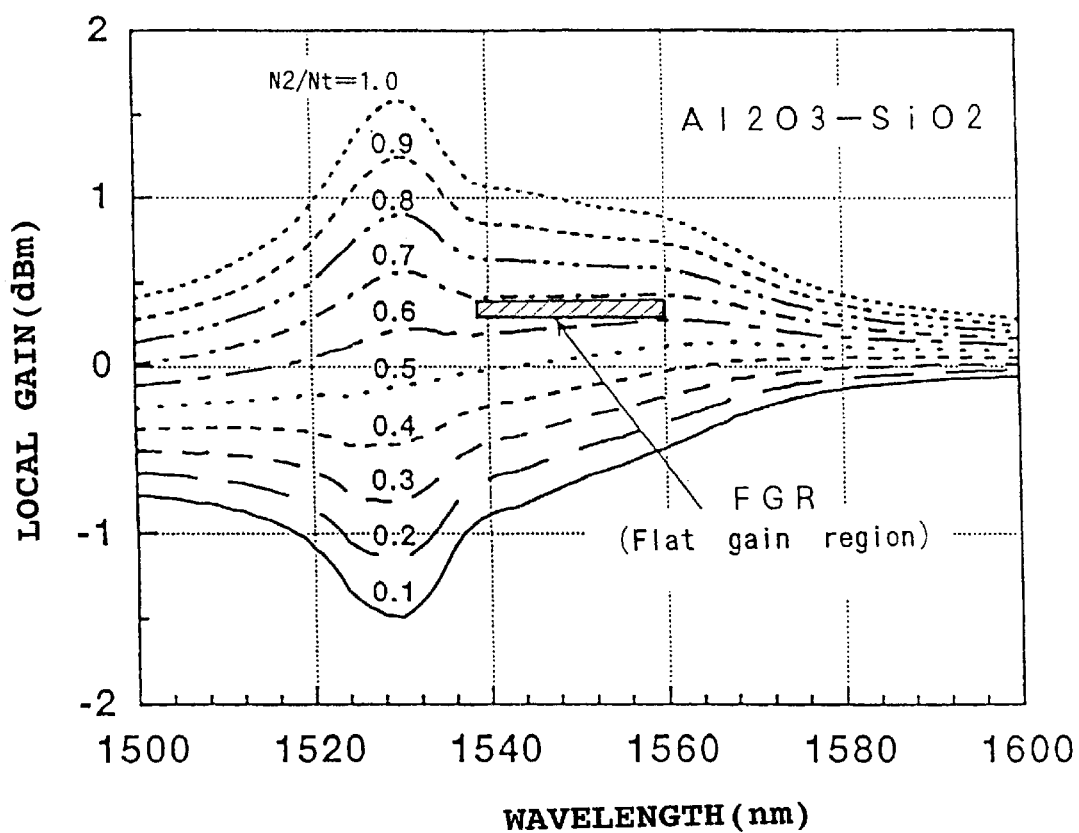
FIG. 3 is a graph showing changes in wavelength characteristic of gain with a population inversion condition (N2/Nt) used as a parameter.

FIG. 3 is a graph showing changes in wavelength characteristic of gain with a population inversion condition N2/Nt used as a parameter in an EDFA having an EDF formed mainly of $Al_2O_3$—$SiO_2$ glass. In FIG. 3, the vertical axis represents local gain (dB/m), and the horizontal axis represents wavelength (nm). The parameter N2/Nt representing a population inversion condition shows a proportion of the number of Er ions in the population inversion condition to the number of all the Er ions. In the case that N2/Nt=1, all the Er ions make a transition to an upper level to obtain a complete population inversion. The wavelength characteristic of gain continuously changes with changes in the parameter N2/Nt.

As apparent from FIG. 3, a substantially flat wavelength characteristic of gain is obtained in a wavelength region of 1540 to 1560 nm in the case that N2/Nt is near 0.7. Accordingly, by always maintaining the operating condition of the EDFA in this population inversion condition, the wavelength dependence of gain can be eliminated. Otherwise if the wavelength characteristic of gain is not flat and a constant gain is maintained, gain equalization can be performed by using a passive optical filter or the like having a constant wavelength characteristic of loss.

In any case, maintaining the wavelength characteristic of gain constant is greatly effective in flattening the gain tilt. An example of maintaining the wavelength characteristic of gain constant is detecting a gain at some given wavelength or in some given band and controlling the power of pump light so that the detected gain becomes constant (automatic gain control: AGC). In this manner, AGC is performed on the basis of the fact that the wavelength characteristic of gain changes in response to the power of pump light as shown in FIG. 2.

However, the wavelength characteristic of gain changes not only in response to the power of pump light, but also in response to the total power of signal light to be amplified. In FIG. 3, for example, in the case that the total power of signal light to be amplified decreases, the number of Er ions in the population inversion condition increases to result in an increase in value of the parameter N2/Nt, so that the gain provided at shorter wavelengths becomes relatively large with respect to the gain provided at longer wavelengths. On the contrary, in the case that the total power of signal light to be amplified increases, the number of Er ions in the population inversion condition decreases to result in a decrease in value of the parameter N2/Nt, so that the gain provided at shorter wavelengths becomes relatively small with respect to the gain provided at longer wavelengths.

Accordingly, in the case that the signal light to be amplified is WDM signal light and that the power per channel of the WDM signal light is maintained at the input of the optical amplifier, the total power of the signal light to be amplified changes with a change in the number of channels, so that the wavelength characteristic of gain changes in accordance with the above-mentioned principle. However, by performing AGC, the power of pump light is adjusted so as to cancel the above change in the wavelength characteristic of gain. Such control is effective in the case that the change in the total power due to the change in the number of channels is small. In general, however, a required power of pump light largely changes according to the number of channels to be handled, so that there is a possibility that the required power of pump light may fall outside a pump light adjustable range determined by the capacity of a pumping source. If the required power of pump light falls outside the adjustable range, a required gain cannot be obtained to cause a change in the wavelength characteristic of gain.

The present invention has solved this problem, for example, by adopting a booster module having an external pumping source for supporting a required gain. This will be described below more specifically.

Figure 4:
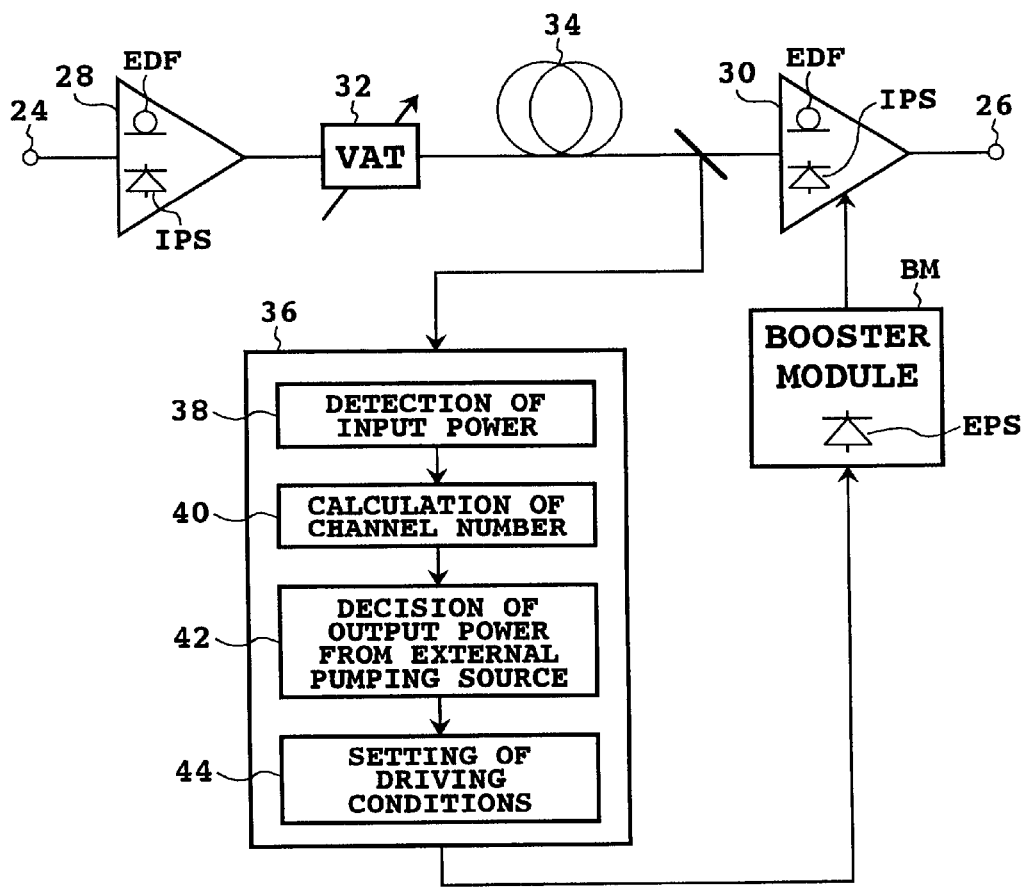
FIG. 4 is a diagram for illustrating a preferred embodiment of the apparatus according to the present invention.

FIG. 4 is a diagram for illustrating a preferred embodiment of the apparatus according to the present invention. This apparatus includes a front-stage optical amplifying section 28 and a rear-stage optical amplifying section 30 between an input port 24 and an output port 26. A variable attenuator (VAT) 32 and a dispersion compensating fiber (DCF) 34 are connected between the optical amplifying sections 28 and 30. This apparatus may be used as each of the optical amplifiers 10, 16, and 18 in the system shown in FIG. 1, for example.

WDM signal light obtained by wavelength division multiplexing a plurality of optical signals allocated to different wavelength channels is supplied to the input port 24. To give a gain to the WDM signal light, each of the front-stage optical amplifying section 28 and the rear-stage optical amplifying section 30 has an erbium doped fiber EDF through which the WDM signal light is passed and an internal pumping source IPS for supplying pump light to the erbium doped fiber EDF.

The WDM signal light supplied to the input port 24 is amplified by the front-stage optical amplifying section 28, and the amplified WDM signal light from the section 28 is then attenuated with a controlled attenuation by the variable attenuator 32, thereafter passing through the dispersion compensating fiber 34. The WDM signal light from the dispersion compensating fiber 34 is further amplified by the rear-stage optical amplifying section 30, and the amplified WDM signal light from the section 30 is output from the output port 26.

To maintain the wavelength characteristic of gain constant, automatic gain control (AGC) is performed in each of the front-stage optical amplifying section 28 and the rear-stage optical amplifying section 30. The attenuation of the variable attenuator 32 is controlled so that the power per channel of the WDM signal light to be supplied to the rear-stage optical amplifying section 30 becomes constant.

As described above, in the case that the number of channels of the WDM signal light to be amplified in the rear-stage optical amplifying section 30 performing AGC changes, there is a possibility that the output power of the internal pumping source IPS in the section 30 may lack because of AGC. To cope with this, this preferred embodiment employs a booster module BM connected to the rear-stage optical amplifying section 30. The booster module BM has an external pumping source EPS for supporting the gain of the rear-stage optical amplifying section 30.

A setting process 36 is adopted to properly set the output power of the external pumping source EPS. In the setting process 36, an input power to the rear-stage optical amplifying section 30, i.e., the total power of the WDM signal light to be supplied to and to be amplified by the rear-stage optical amplifying section 30 is first detected in step 38. Then, the number of channels of the WDM signal light is calculated according to the detected power in step 40. Then, the output power of the external pumping source EPS is decided according to the above-obtained number of channels in step 42. Finally, the driving condition for the external pumping source EPS is set in step 44.

According to this preferred embodiment, the driving condition for the external pumping source EPS is set according to the obtained number of channels of the WDM signal light, thereby easily responding to a change in the number of channels of the WDM signal light.

Figure 5:
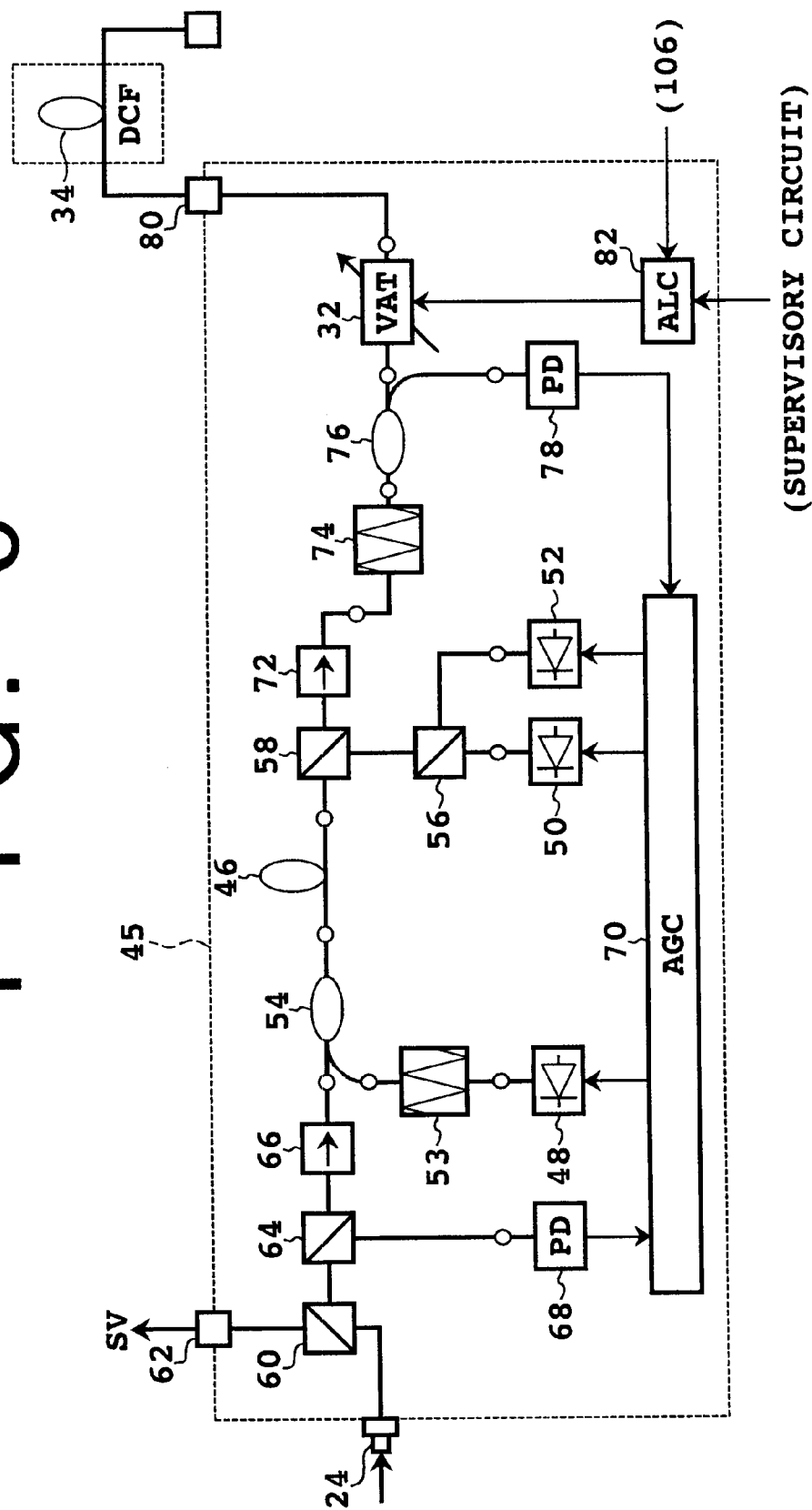
FIG. 5 is a block diagram showing a preferred embodiment of a front-stage optical amplifying module.
Figure 6:
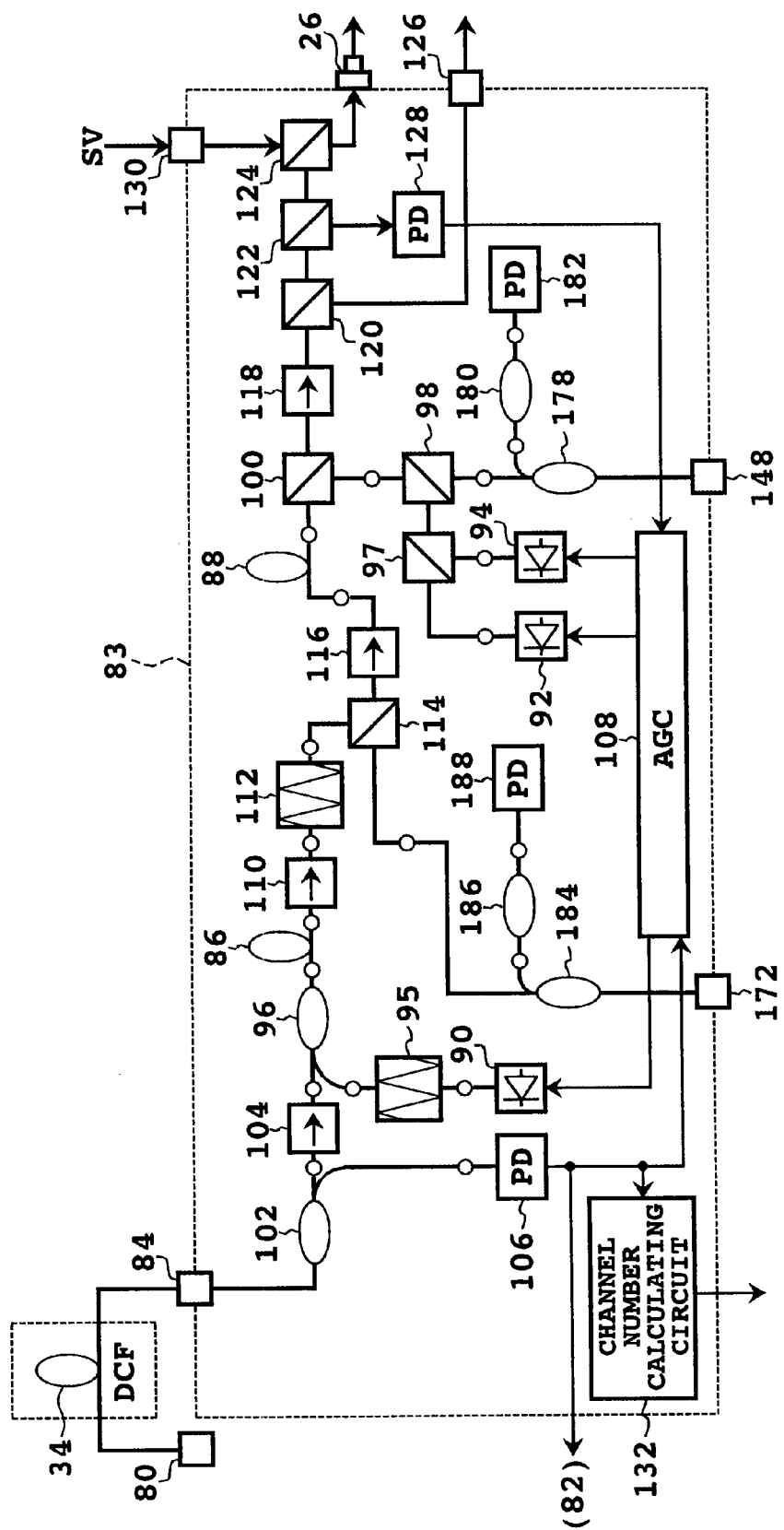
FIG. 6 is a block diagram showing a preferred embodiment of a rear-stage optical amplifying module.
Figure 7:
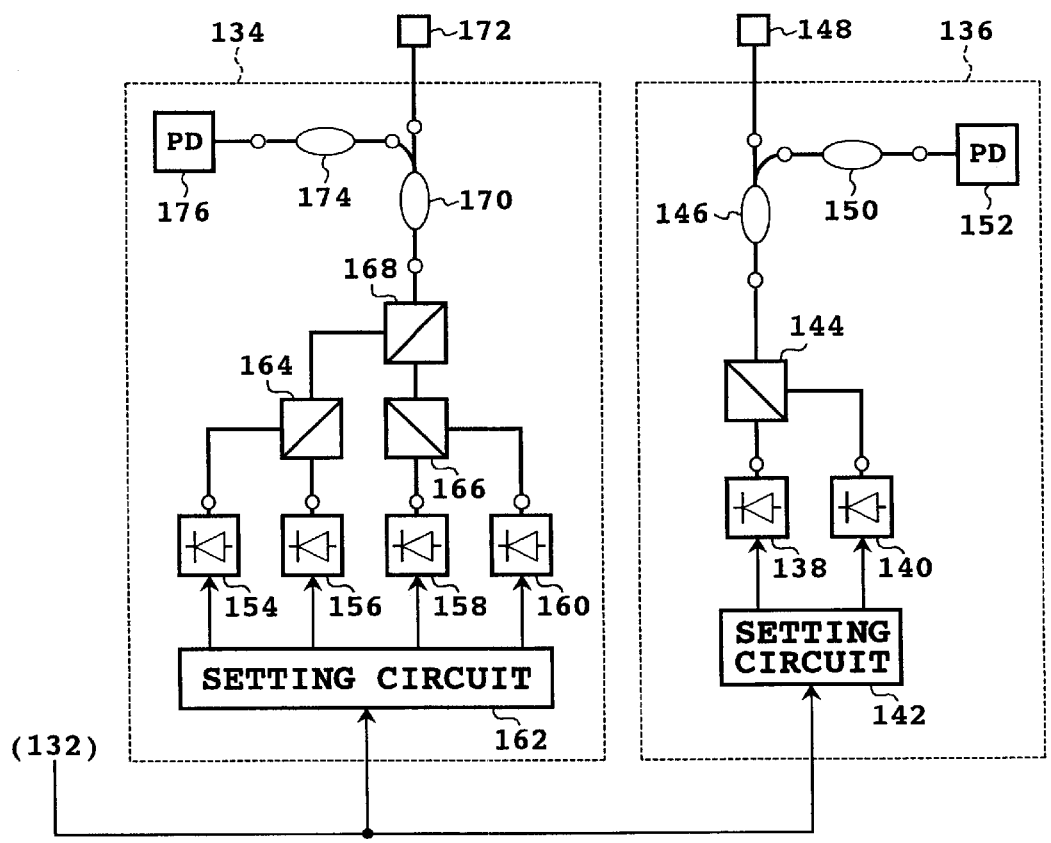
FIG. 7 is a block diagram showing a preferred embodiment of a booster module.

More specifically, the apparatus shown in FIG. 4 is provided by a front-stage optical amplifying module 45 shown in FIG. 5, a rear-stage optical amplifying module 83 shown in FIG. 6, and booster modules 134 and 136 shown in FIG. 7. The front-stage optical amplifying module 45 includes the front-stage optical amplifying section 28 and the variable attenuator 32 shown in FIG. 4. The rear-stage optical amplifying module 83 includes the rear-stage optical amplifying section 30 shown in FIG. 4. The booster modules 134 and 136 correspond to the booster module BM shown in FIG. 4.

Referring to FIG. 5, an EDF 46 corresponding to the erbium doped fiber EDF in the front-stage optical amplifying section 28 is used. Further, laser diodes 48, 50, and 52 corresponding to the internal pumping source IPS in the front-stage optical amplifying section 28 are used. The laser diode 48 outputs a pump light beam having a wavelength of about 980 nm. The laser diode 50 outputs a pump light beam having a P-polarization plane parallel to the sheet plane of FIG. 5 and having a wavelength of about 1480 nm. The laser diode 52 outputs a pump light beam having an S-polarization plane perpendicular to the sheet plane of FIG. 5 and having a wavelength of about 1480 nm.

The pump light beam output from the laser diode 48 is supplied through a fiber grating 53 and a WDM coupler 54 into the EDF 46 from its front end. The fiber grating 53 is used to stabilize the center wavelength of the pump light beam passing therethrough. Accordingly, an optical bandpass filter having a narrow passband may be used in place of the fiber grating 53.

The pump light beams output from the laser diodes 50 and 52 are combined by a polarization beam splitter 56, and as a result, a pump light beam having a wavelength band of 1480 nm is obtained. The pump light beam thus obtained is supplied through a WDM coupler 58 into the EDF 46 from its rear end.

WDM signal light to be amplified is supplied to the input port 24 provided by an optical connector. The WDM signal light from the input port 24 is supplied to a WDM coupler 60 to extract a supervisory optical signal (SV). The supervisory optical signal extracted by the WDM coupler 60 is supplied through an optical connector 62 to a supervisory circuit (not shown).

The WDM signal light left after the extraction of the supervisory optical signal is supplied through a beam splitter 64, an optical isolator 66, and the WDM coupler 54 into the EDF 46 from its front end. The beam splitter 64 branches off monitor light reflecting an input power to the front-stage optical amplifying module 45. The monitor light from the beam splitter 64 is supplied to a photodetector (PD) 68 and converted into an electrical signal having a level corresponding to the power of the monitor light by the photodetector 68. The electrical signal output from the photodetector 68 is supplied to an AGC circuit 70.

When the WDM signal light is supplied to the EDF 46 being pumped by the laser diodes 48, 50, and 52, the WDM signal light is amplified during propagation in the EDF 46. The amplified WDM signal light from the EDF 46 is supplied through the WDM coupler 58, an optical isolator 72, a fiber grating 74, and an optical coupler 76 to the variable attenuator 32. The fiber grating 74 functions as a gain equalizer or compensating device for compensating the wavelength characteristic of gain generated in the EDF 46 to obtain a flat gain tilt.

The attenuation given to the WDM signal light by the variable attenuator 32 is controlled by an ALC (automatic level control) circuit 82. This control will be hereinafter described in detail. The WDM signal light passed through the variable attenuator 32 is supplied through an optical connector 80 to the dispersion compensating fiber (DCF) 34.

The optical coupler 76 branches off monitor light reflecting an output power from the front-stage optical amplifying module 45. The monitor light from the optical coupler 76 is supplied to a photodetector 78 and converted into an electrical signal having a level corresponding to the power of the monitor light by the photodetector 78. The electrical signal output from the photodetector 78 is supplied to the AGC circuit 70 as an adjusting unit.

The AGC circuit 70 controls drive currents (bias currents) for the laser diodes 48, 50, and 52 so that the gain given to the WDM signal light by the EDF 46 is maintained constant. This control allows the wavelength characteristic of gain generated in the EDF 46 be maintained constant. Accordingly, although the wavelength characteristic of loss of the fiber grating 74 is fixed, the gain tilt of the front-stage optical amplifying module 45 can be maintained flat.

Referring to FIG. 6, the WDM signal light passed through the dispersion compensating fiber 34 is supplied through an optical connector 84 to the rear-stage optical amplifying module 83. The rear-stage optical amplifying module 83 has two EDFs 86 and 88 corresponding to the erbium doped fiber EDF in the rear-stage optical amplifying section 30 shown in FIG. 4. Further, the rear-stage optical amplifying module 83 has three laser diodes 90, 92, and 94 corresponding to the internal pumping source IPS in the rear-stage optical amplifying section 30 shown in FIG. 4. The laser diode 90 outputs a pump light beam having a wavelength of about 980 nm. The laser diode 92 outputs a pump light beam having a P-polarization plane and having a wavelength of about 1460 nm. The laser diode 94 outputs a pump light beam having an S-polarization plane and having a wavelength of about 1460 nm.

The pump light beam output from the laser diode 90 is supplied through a fiber grating 95 and a WDM coupler 96 into the EDF 86 from its front end. The fiber grating 95 is provided to stabilize the center wavelength of the pump light beam passing therethrough. Accordingly, an optical bandpass filter having a narrow passband may be used in place of the fiber grating 95.

The pump light beams output from the laser diodes 92 and 94 are combined by a polarization beam splitter 97, and as a result, a pump light beam having a wavelength band of 1460 nm is obtained. The pump light beam thus obtained is supplied through a WDM couplers 98 and 100 into the EDF 88 from its rear end.

The WDM signal light passed through the optical connector 84 is supplied through an optical coupler 102, an optical isolator 104, and the optical coupler 96 into the EDF 86 from its front end. The optical coupler 102 branches off monitor light reflecting an input power to the rear-stage optical amplifying module 83. The monitor light from the optical coupler 102 is supplied to a photodetector 106 and converted into an electrical signal having a level corresponding to the power of the monitor light by the photodetector 106. The electrical signal output from the photodetector 106 is supplied to an AGC circuit 108 as an adjusting device.

When the WDM signal light is supplied to the EDF 86 being pumped by the laser diode 90, the WDM signal light is amplified during propagation in the EDF 86. The amplified WDM signal light from the EDF 86 is supplied through an optical isolator 110, a fiber grating 112, a WDM coupler 114, and an optical isolator 116 into the EDF 88 from its front end.

The fiber grating 112 functions as a gain equalizer or compensating device for compensating the wavelength characteristic of gain given to the WDM signal light by the rear-stage optical amplifying module 83 to maintain the gain tilt flat.

When the WDM signal light is supplied to the EDF 88 being pumped by the laser diodes 92 and 94 or by the laser diodes 90, 92, and 94, the WDM signal light is amplified during propagation in the EDF 88. The amplified WDM signal light from the EDF 88 is passed through the WDM coupler 100, an optical isolator 118, a beam splitter 120, a beam splitter 122, and a WDM coupler 124, and finally output from the output port 26 of the rear-stage optical amplifying module 83. The output port 26 is provided by an optical connector.

The beam splitter 120 branches off monitor light for monitoring the wavelength of each channel of the WDM signal light. The monitor light from the beam splitter 120 may be supplied through an optical connector 126 to an optical spectrum analyzer (not shown) as required.

The beam splitter 122 branches off monitor light reflecting an output power from the rear-stage optical amplifying module 83. The monitor light from the beam splitter 122 is supplied to a photodetector 128 and converted into an electrical signal having a level corresponding to the power of the monitor light. The electrical signal output from the photodetector 128 is supplied to the AGC circuit 108.

The supervisory optical signal updated in the supervisory circuit is supplied through an optical connector 130 to the WDM coupler 124. Accordingly, this supervisory optical signal is transmitted as one additional channel in the WDM signal light to an optical repeater or the like on the downstream side of this apparatus.

The AGC circuit 108 controls drive currents (bias currents) for the laser diodes 90, 92, and 94 so that the gain given to the WDM signal light by the rear-stage optical amplifying module 83 is maintained constant. As a result, the wavelength characteristic of gain in the rear-stage optical amplifying module 83 is maintained constant. Accordingly, although the wavelength characteristic of loss of the fiber grating 112 is fixed, the gain tilt of the rear-stage optical amplifying module 83 can be maintained flat.

The ALC circuit 82 controls the attenuation of the variable attenuator 32 so that the power per channel of the WDM signal light to be supplied to the rear-stage optical amplifying module 83 is maintained constant. To perform ALC, the output signal from the photodetector 106 for detecting the input power to the rear-stage optical amplifying module 83 is supplied to the ALC circuit 82. A signal giving the number of channels of the WDM signal light is also supplied from the supervisory circuit to the ALC circuit 82. The ALC circuit 82 includes a comparator for comparing the level of the output signal from the photodetector 106 with a reference level to output an error signal corresponding to the difference between these levels. In this case, the reference level is modified according to the signal giving the number of channels.

Thus, the power per channel of the WDM signal light to be supplied to the rear-stage optical amplifying module 83 is maintained constant. Accordingly, the number of channels of the WDM signal light to be supplied to the rear-stage optical amplifying module 83 can be detected according to the output signal from the photodetector 106. In this preferred embodiment, a channel number calculating circuit 132 is connected to the photodetector 106 to calculate the number of channels according to the output signal from the photodetector 106.

Referring to FIG. 7, the booster module 136 has laser diodes 138 and 140 corresponding to the external pumping source EPS shown in FIG. 4. The laser diode 138 outputs a pump light beam having a P-polarization plane and having a wavelength of about 1480 nm. The laser diode 140 outputs a pump light beam having an S-polarization plane and having a wavelength of about 1480 nm. The pump light beams output from the laser diodes 138 and 140 are combined by a polarization beam splitter 144 to obtain a pump light beam having a wavelength band of 1480 nm. The pump light beam from the polarization beam splitter 144 is supplied through an optical coupler 146 and an optical connector 148 to the rear-stage optical amplifying module 83. The optical connector 148 is detachable with respect to the rear-stage optical amplifying module 83.

The optical coupler 146 branches off monitor light from the pump light beam output from the polarization beam splitter 144. The monitor light from the optical coupler 146 is supplied through an optical attenuator 150 to a photodetector 152. A setting circuit 142 is connected to the laser diodes 138 and 140. The setting circuit 142 receives the signal indicative of the number of channels of the WDM signal light from the channel number calculating circuit 132 in the rear-stage optical amplifying module 83, and sets drive currents (bias currents) for the laser diodes 138 and 140 according to the number of channels.

The booster module 134 has laser diodes 154, 156, 158, and 160 corresponding to the external pumping source EPS shown in FIG. 4. Drive currents (bias currents) for the laser diodes 154, 156, 158, and 160 are set by a setting circuit 162 as in the booster module 136.

The laser diode 154 outputs a pump light beam having an S-polarization plane and having a wavelength of about 1460 nm. The laser diode 156 outputs a pump light beam having a P-polarization plane and having a wavelength of about 1460 nm. The laser diode 158 outputs a pump light beam having a P-polarization plane and having a wavelength of about 1480 nm. The laser diode 160 outputs a pump light beam having an S-polarization plane and having a wavelength of about 1480 nm.

The pump light beams output from the laser diodes 154 and 156 are combined by a polarization beam splitter 164 to obtain a pump light beam having a wavelength band of 1460 nm. The pump light beams output from the laser diodes 158 and 160 are combined by a polarization beam splitter 166 to obtain a pump light beam having a wavelength band of 1480 nm. The pump light beam from the polarization beam splitter 164 and the pump light beam from the polarization beam splitter 166 are wavelength division multiplexed by a WDM coupler 168 to obtain a multiplexed pump light beam. The multiplexed pump light beam from the WDM coupler 168 is supplied through an optical coupler 170 and an optical connector 172 to the rear-stage optical amplifying module 83. The optical connector 172 is detachable with respect to the rear-stage optical amplifying module 83.

The optical coupler 170 branches off monitor light from the multiplexed pump light beam. The monitor light from the optical coupler 170 is supplied through an optical attenuator 174 to a photodetector 176.

Referring again to FIG. 6, the pump light beam from the booster module 136 through the optical connector 148 is supplied through an optical coupler 178, the WDM coupler 98, and the WDM coupler 100 into the EDF 88 from its rear end. The optical coupler 178 branches off monitor light from this pump light beam. The monitor light from the optical coupler 178 is supplied through an optical attenuator 180 to a photodetector 182.

The multiplexed pump light beam from the booster module 134 through the optical connector 172 is supplied through an optical coupler 184, the WDM coupler 114, and the optical isolator 116 into the EDF 88 from its front end. The optical coupler 184 branches off monitor light from the multiplexed pump light beam. The monitor light from the optical coupler 184 is supplied through an optical attenuator 186 to a photodetector 188.

Figure 8:
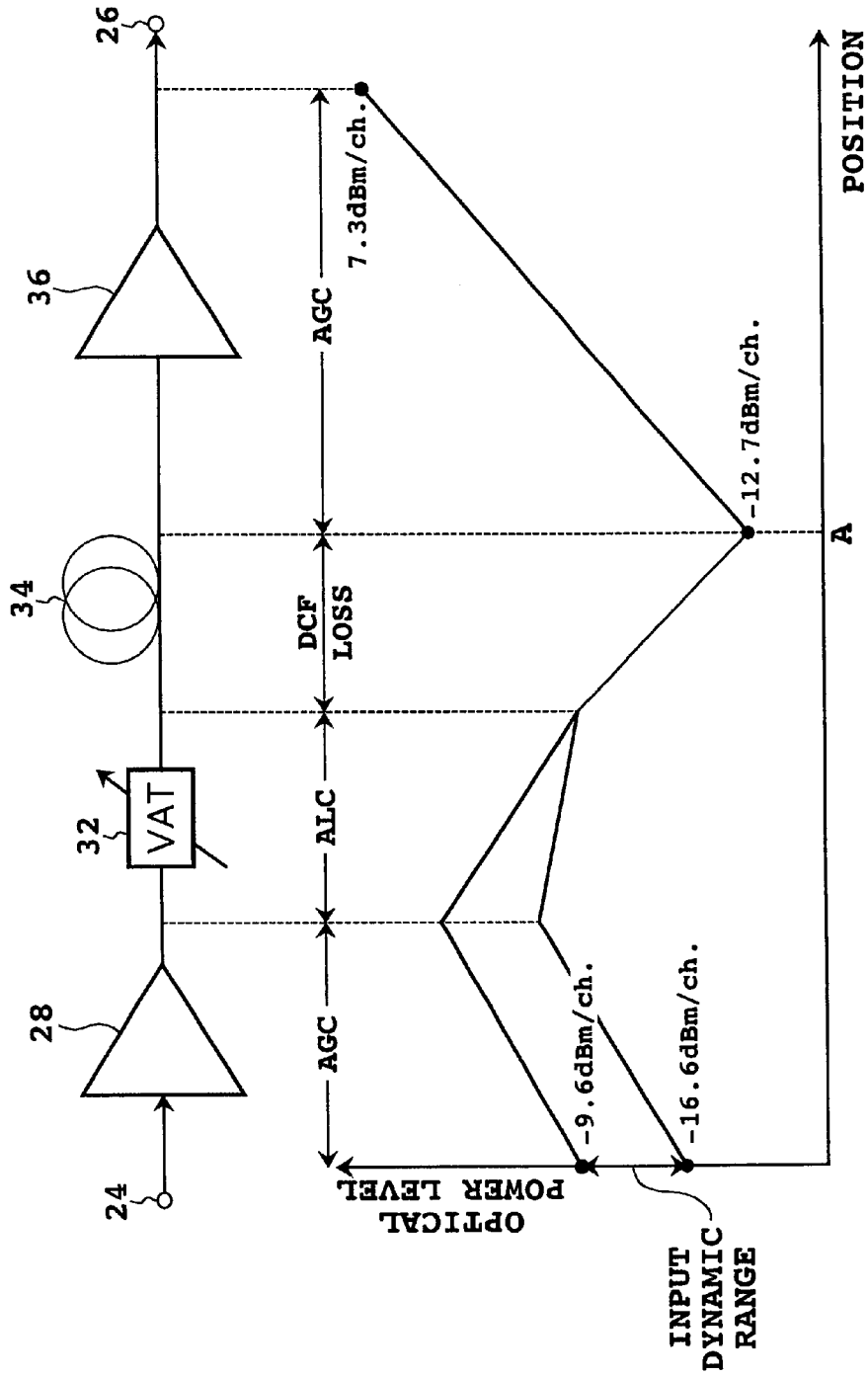
FIG. 8 is a power diagram in the preferred embodiment of the present invention.

FIG. 8 is a power diagram in the above preferred embodiment of the present invention. In this preferred embodiment, the attenuation of the variable attenuator 32 is controlled so that the power per channel of the WDM signal light is maintained constant at the input of the rear-stage optical amplifying section 36 shown by A in FIG. 8. For example, the target value of the optical power at the input of the rear-stage optical amplifying section 36 is −12.7 dBm/ch.

Since the attenuation of the variable attenuator 32 is controlled as mentioned above and AGC is performed in the front-stage optical amplifying section 28, a required input dynamic range can be obtained. For example, the input dynamic range is from −16.6 dBm/ch. to −9.6 dBm/ch.

Since AGC is also performed in the rear-stage optical amplifying section 36, the power per channel of the WDM signal light to be output from the output port 26 can be maintained constant. For example, the controlled optical power at the output port 26 is 7.3 dBm/ch.

Accordingly, the gain of the rear-stage optical amplifying section 36 is 20 dB in this preferred embodiment. As shown in FIG. 6, this gain is maintained constant by controlling the drive currents for the laser diodes 90, 92, and 94 as the internal pumping source IPS by means of the AGC circuit 108. However, in the case that the number of channels of the WDM signal light is increased in association with system upgrading, there is a possibility that the required power of pump light may exceed the upper limit of a pump light adjustable range, causing a problem that AGC cannot be effectively performed. In this preferred embodiment, the booster module 134 and/or the booster module 136 are/is used to support the gain in the rear-stage optical amplifying module 83. The operation of the setting circuits 142 and 162 in the booster modules 134 and 136 will now be described more specifically.

Figure 9:
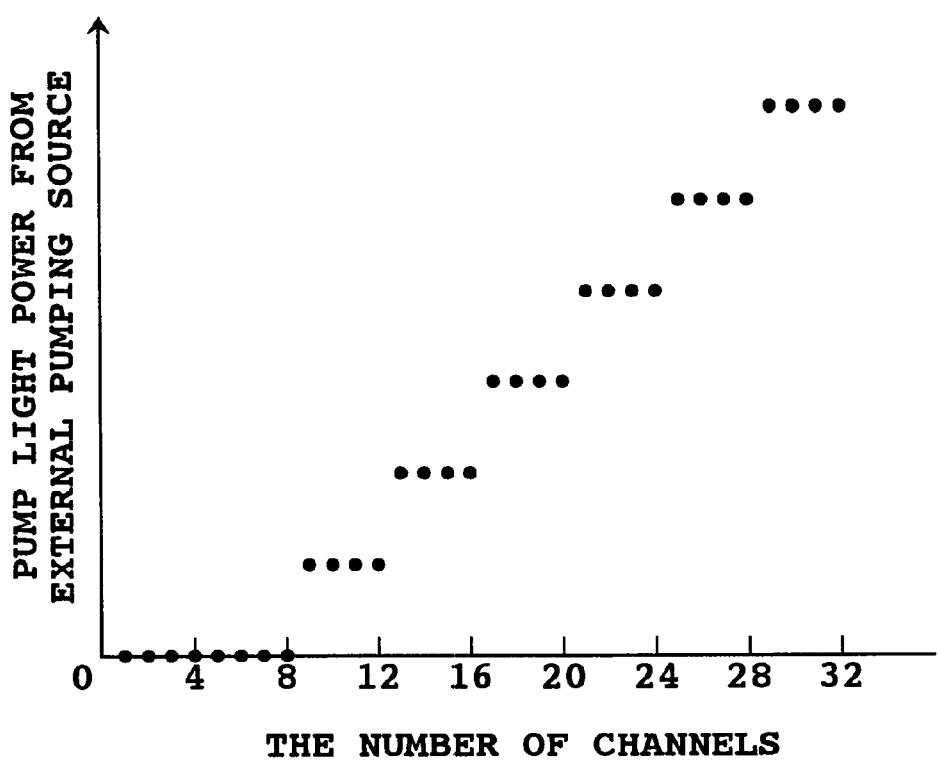
FIG. 9 is a graph showing an example of the relation between the pump light power from an external pumping source and the number of channels of WDM signal light.

FIG. 9 is a graph showing an example of the relation between the pump light power from the external pumping source and the number of channels of the WDM signal light. In this preferred embodiment, the range of the plurality of the number of channels of the WDM signal light is predetermined, and a constant output power from the external pumping source is decided according to the above predetermined range. This will now be described more specifically.

When the power (input power) of the WDM signal light to be supplied to the rear-stage optical amplifying module 83 is in the range of −12.0 to −3.0 dBm, the number of channels is determined to fall within the range of 1 to 8. In this case, the booster modules 134 and 136 are not required, and a required gain can be maintained constant by controlling the output power of the internal pumping source within its adjustable range.

When the input power is in the range of −2.9 to −1.2 dBm, the number of channels is determined to fall within the range of 9 to 12. In this case, the booster module 136 is used, and the output power of the booster module 136 is set to ½ of its maximum output power. For example, the setting circuit 142 supplies to one of the laser diodes 138 and 140 its maximum drive current.

When the input power is in the range of −1.1 to 0.0 dBm, the number of channels is determined to fall within the range of 13 to 16. In this case, the booster module 136 is used, and the output power of the booster module 136 is set to its maximum output power. For example, the setting circuit 142 supplies to both the laser diodes 138 and 140 their respective maximum drive currents.

When the input power is in the range of 0.1 to 1.0 dBm, the number of channels is determined to fall within the range of 17 to 20. In this case, the booster modules 134 and 136 are used. The output power of the booster module 136 is set to its maximum output power. For example, the setting circuit 142 supplies to the laser diodes 138 and 140 their respective maximum drive currents. Further, the output power of the booster module 134 is set to ¼ of its maximum output power. For example, the setting circuit 162 supplies to each of the laser diodes 154, 156, 158, and 160 ¼ of its maximum drive current.

When the input power is in the range of 1.1 to 1.8 dBm, the number of channels is determined to fall within the range of 21 to 24. In this case, the booster modules 134 and 136 are used. The output power of the booster module 136 is set to its maximum output power. The output power of the booster module 134 is set to ½ of its maximum output power. For example, the setting circuit 162 supplies to each of the laser diodes 154, 156, 158, and 160 ½ of its maximum drive current.

When the input power is in the range of 1.9 to 2.4 dBm, the number of channels is determined to fall within the range of 25 to 28. In this case, the booster modules 134 and 136 are used. The output power of the booster module 136 is set to its maximum output power. The output power of the booster module 134 is set to ¾ of its maximum output power. For example, the setting circuit supplies to each of the laser diodes 154, 156, 158, 160 ¾ of its maximum drive current.

When the input power is in the range of 2.5 to 3.0 dBm, the number of channels is determined to fall within the range of 29 to 32. In this case, the booster modules 134 and 136 are used. The output power of the booster module 136 is set to its maximum output power, and the output power of the booster module 134 is also set to its maximum output power. For example, the setting circuit 162 supplies to each of the laser diodes 154, 156, 158, and 160 its maximum drive current.

In this manner, the output power of the booster module 134 and/or the output power of the booster module are/is set according to the number of channels of the signal light to be amplified, so that nearly optimum pumping conditions can be obtained in the rear-stage optical amplifying module 83. Accordingly, AGC can be performed only by adjusting the output power of the internal pumping source, thereby allowing easy response change in the number of channels of the WDM signal As a modification of this preferred embodiment, a method including preliminarily providing a high-output pumping source capable of supporting inputs of 32 channels as the internal pumping source may be proposed. However, the number of channels to be used differs according to a user, and it is sometimes demanded to gradually increase the number of channels. Accordingly, the above-mentioned method that may be proposed has a problem such that the required specifications are excessive at the time of constructing a system, causing a remarkable increase in initial cost. To the contrary, this preferred embodiment has an advantage that the booster modules 134 and 136 can be selectively connected to the optical amplifying module 83, thereby allowing easy upgrading of the system. Further, since each booster module has a plurality of laser diodes as the external pumping source, the output power of each booster module can be easily set, thereby improving the in-service upgradability of an optical amplifier.

In this preferred embodiment, the variable attenuator 32 and the ALC circuit 82 are used to maintain constant the power per channel of the WDM signal light to be supplied to the rear-stage optical amplifying module 83. As a result, the number of channels of the WDM signal light to be supplied to the rear-stage optical amplifying module 83 can be obtained according to a detected value of the power of the WDM signal light. As another way, it may be proposed to obtain the number of channels according to the signal from the supervisory circuit. In this case, however, there occurs a time lag from the time the number of channels changes to the time the supervisory circuit detects this change, so that the output power of the booster module cannot be maintained optimal. To the contrary, this preferred embodiment has an advantage that the number of channels can be obtained in real time according to a detected value of the power of the WDM signal light to be supplied to the rear-stage optical amplifying module 83.

In this preferred embodiment, a gain in the rear-stage optical amplifying module 83 is detected, and the output power of the internal pumping source is controlled so that the detected gain is maintained constant (AGC). In other words, the external pumping source is not included in a loop for the AGC. In the case that the external pumping source is included in the loop for the AGC, the transfer of complex analog signals is required between the booster module and the optical amplifying module. The analog signals for the control between the modules are susceptible to noise, resulting in a possibility of large error in the AGC. Accordingly, the AGC using the internal pumping source only is effective in solving the above problem.

In the booster module 136 shown in FIG. 7, the laser diodes 138 and 140 are used as the external pumping source, and the setting circuit 142 selects either driving one of the laser diodes 138 and 140 with its maximum drive current or driving both the laser diodes 138 and 140 with their respective maximum drive currents. Accordingly, the laser diode 138 or 140 is driven with its maximum drive current, so that the spectrum of the pump light beam can be maintained stable.

In the booster module 134 shown in FIG. 7, the four laser diodes 154, 156, 158, and 160 are used as the external pumping source, and the setting circuit 162 sets the drive current for each laser diode. Accordingly, by stepwise changing each drive current, the output power of the external pumping source can be easily set.

While each booster module has a plurality of laser diodes in the preferred embodiment shown in FIG. 7, a booster module having one laser diode may be adopted. In this case, the output power of the external pumping source may be set by stepwise changing the drive current for the laser diode in the setting circuit, for example.

This preferred embodiment adopts a feedback loop for maintaining constant the power per channel of the WDM signal light to be supplied to the rear-stage optical amplifying module 83. This feedback loop includes the variable attenuator 32 for giving a variable attenuation to the WDM signal light. Particularly in this preferred embodiment, this feedback loop further includes the dispersion compensating fiber 34 as a dispersion compensator through which the WDM signal light is passed. The loss by the dispersion compensating fiber 34 changes according to a set amount of chromatic dispersion to be given by the dispersion compensating fiber 34. Accordingly, by making the dispersion compensating fiber 34 be included in the feedback loop, variations in the loss by the dispersion compensating fiber 34 can be absorbed to thereby allow more accurate control.

While the booster modules 134 and 136 are detachable with respect to the rear-stage optical amplifying module 83 in the above preferred embodiment, the configuration of the front-stage optical amplifying module 45 may be modified to make the booster modules detachable with respect to the front-stage optical amplifying module 45.

While the booster module is applied to the optical amplifying module undergoing AGC in the above preferred embodiment, the booster module is applicable also to the optical amplifying module not undergoing AGC.

While the number of channels of the WDM signal light to be supplied to the optical amplifying module is detected according to a detected value of the power of the WDM signal light in the above preferred embodiment, the number of channels may be detected according to the supervisory optical signal.

While the optical amplifying module is configured by using an EDF in the above preferred embodiment, the present invention is not limited to this configuration, but any other doped fibers doped with rare earth elements such as Nd (neodymium) and Yb (ytterbium) may be used.

Further, the present invention is not limited by the point that the optical amplifying module has a doped fiber. The optical amplifying module may be configured by using a semiconductor optical amplifier.

According to the present invention as described above, it is possible to provide a method, apparatus, and system for optical amplification which can easily respond to a change in the number of channels of WDM signal light. The effects obtained by the specific preferred embodiment of the present invention have been described, so the description thereof will be omitted herein.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method comprising the steps of:
   (a) providing an optical amplifying module having an internal pumping source;
   (b) supplying to said optical amplifying module WDM signal light obtained by wavelength division multiplexing a plurality of optical signals allocated to different wavelength channels;
   (c) adjusting an output power from said internal pumping source so that said optical amplifying module provides a gain for said WDM signal light;
   (d) connecting to said optical amplifying module a booster module having an external pumping source for supporting said gain; and
   (e) setting an output power from said external pumping source according to the number of channels of said WDM signal light, to obtain a required gain which is outside an adjustable range of said internal pumping source.

2. A method according to claim 1, wherein said step (b) includes the step of maintaining constant the power per channel of said WDM signal light to be supplied to said optical amplifying module.

3. A method according to claim 2, wherein said step (e) comprises the steps of detecting the power of said WDM signal light to be supplied to said optical amplifying module, and obtaining said number of channels according to said power detected.

4. A method according to claim 1, wherein said step (c) comprises the steps of detecting said gain, and controlling the output power from said internal pumping source so that said gain detected is maintained constant.

5. A method according to claim 1, wherein said step (e) comprises the steps of predetermining a range of plurality of said number of channels, and deciding a constant output power from said external pumping source for said predetermined range.

6. A method according to claim 1, wherein:
   said optical amplifying module further has a doped fiber doped with a rare earth element;
   each of said internal pumping source and said external pumping source supplying pump light to said doped fiber.

7. A method according to claim 6, wherein said doped fiber comprises an erbium doped fiber.

8. A method according to claim 6, wherein:
   said external pumping source comprises first and second laser diodes each for outputting said pump light;
   said step (e) comprising the step of selecting either driving one of said first and second laser diodes or driving both of said first and second laser diodes.

9. A method according to claim 6, wherein:
   said external pumping source comprises a plurality of laser diodes each for outputting said pump light;
   said step (e) comprising the step of setting a drive current for each of said laser diodes.

10. A method according to claim 6, wherein:
    said external pumping source comprises a laser diode for outputting said pump light;
    said step (e) comprising the step of setting a drive current for said laser diode.

11. A method comprising the steps of:
    (a) providing an optical amplifying module having an internal pumping source;
    (b) supplying signal light to said optical amplifying module;
    (c) adjusting an output power from said internal pumping source so that said optical amplifying module provides a gain for said signal light;
    (d) connecting a booster module having an external pumping source to said optical amplifying module; and
    (e) setting an output power from said external pumping source according to the power of said signal light to obtain a required gain which is outside the adjustable range of said internal pumping source.

12. A method according to claim 11, wherein said signal light comprises WDM signal light obtained by wavelength division multiplexing a plurality of optical signals allocated to different wavelength channels.

13. A method according to claim 11, wherein said step (c) comprises the steps of detecting said gain, and controlling the output power from said internal pumping source so that said gain detected is maintained constant.

14. An apparatus comprising:
    an optical amplifying module having an internal pumping source, to which WDM signal light obtained by wavelength division multiplexing a plurality of optical signals allocated to different wavelength channels is supplied;

an adjusting unit for adjusting an output power from said internal pumping source so that said optical amplifying module provides a gain for said WDM signal light; and a booster module having an external pumping source for supporting said gain, said booster module being connectable to said optical amplifying module;

an output power from said external pumping source being set according to the number of channels of said WDM signal light, to obtain a required gain which is outside an adjustable range of said internal pumping source.

15. An apparatus according to claim 14, further comprising a feedback loop for maintaining constant the power per channel of said WDM signal light to be supplied to said optical amplifying module.

16. An apparatus according to claim 15, wherein said feedback loop includes a variable attenuator for giving a variable attenuation to said WDM signal light to be supplied to said optical amplifying module.

17. An apparatus according to claim 15, wherein said feedback loop includes a dispersion compensator through which said WDM signal light is passed.

18. An apparatus according to claim 15, further comprising a detector for detecting the power of said WDM signal light to be supplied to said optical amplifying module, said number of channels being obtained according to the power detected by said detector.

19. An apparatus according to claim 14, wherein said booster module further has a setting circuit for setting the output power from said external pumping source according to said number of channels of said WDM signal light.

20. An apparatus according to claim 14, wherein said adjusting unit comprises a gain control circuit for detecting said gain and controlling the output power from said internal pumping source so that said gain detected is maintained constant.

21. An apparatus according to claim 20, further comprising a compensating device for compensating the wavelength dependence of said gain.

22. An apparatus according to claim 14, wherein a range of plurality of said number of channels is predetermined, and a constant output power from said external pumping source is decided for said predetermined range.

23. An apparatus according to claim 14, wherein:

said optical amplifying module further has a doped fiber doped with a rare earth element;

each of said internal pumping source and said external pumping source supplying pump light to said doped fiber.

24. An apparatus according to claim 23, wherein said doped fiber comprises an erbium doped fiber.

25. An apparatus according to claim 23, wherein:

said external pumping source comprises first and second laser diodes each for outputting said pump light;

said booster module further having a setting circuit for selecting either driving one of said first and second laser diodes or driving both of said first and second laser diodes.

26. An apparatus according to claim 23, wherein:

said external pumping source comprises a plurality of laser diodes each for outputting said pump light;

said booster module further having a setting circuit for setting a drive current for each of said laser diodes.

27. An apparatus according to claim 23, wherein:

said external pumping source comprises a first laser diode for outputting a first pump light beam having a first polarization plane, and a second laser diode for outputting a second pump light beam having a second polarization plane perpendicular to said first polarization plane; and said booster module further has a polarization beam splitter for combining said first and second pump light beams to obtain said pump light.

28. An apparatus according to claim 23, wherein:

said external pumping source comprises a first laser diode for outputting a first pump light beam having a first wavelength, and a second laser diode for outputting a second pump light beam having a second wavelength different from said first wavelength; and said booster module further has a WDM coupler for wavelength division multiplexing said first and second pump light beams to obtain said pump light.

29. A system comprising:

an optical fiber transmission line for transmitting WDM signal light obtained by wavelength division multiplexing a plurality of optical signals allocated to different wavelength channels; and at least one optical repeater arranged along said optical fiber transmission line;

said optical repeater comprising:

an optical amplifying module having an internal pumping source, to which said WDM signal light is supplied;

an adjusting unit for adjusting an output power from said internal pumping source so that said optical amplifying module provides a gain for said WDM signal light;

a booster module having an external pumping source for supporting said gain, said booster module being connectable to said optical amplifying module; and an output power from said external pumping source being set according to the number of channels of said WDM signal light, to obtain a required gain which is outside an adjustable range of said internal pumping source.

30. An apparatus comprising:

a front-stage optical amplifying section and a rear-stage optical amplifying section each for providing a gain to WDM signal light obtained by wavelength division multiplexing a plurality of optical signals allocated to different wavelength channels;

a variable attenuator optically connected between said front-stage optical amplifying section and said rear-stage optical amplifying section;

a circuit for controlling said variable attenuator so that the power per channel of said WDM signal light to be supplied to said rear-stage optical amplifying section is maintained constant; and a booster module having an external pumping source for supporting said gain in said rear-stage optical amplifying section, wherein an output power from said external pumping source is set according to the number of channels of said WDM signal light to obtain a required gain different from the gain in said rear-stage optical amplifying section.

31. An apparatus comprising:

an external pumping source for supporting a gain of WDM signal light to be supplied to an optical amplifying module, said external pumping source being connected to said optical amplifying module; and an output power from said external pumping source being set in accordance with an increase in power of the signal light, to obtain a required gain different from the gain of WDM signal light supplied to the optical amplifying module.

32. A method comprising:

connecting a booster module having an external pumping source to an optical amplifying module, wherein said external pumping source supports a gain of WDM signal light to be supplied to said optical amplifying module; and setting an output power from said external pumping source in accordance with an increase in power of the signal light, to obtain a required gain different from the gain of WDM signal light supplied to the optical amplifying module.

33. A method comprising the steps of:

(a) providing an optical amplifying module having a first pumping source;

(b) supplying to said optical amplifying module WDM signal light obtained by wavelength division multiplexing a plurality of optical signals allocated to different wavelength channels;

(c) adjusting an output power from said first pumping source so that said optical amplifying module provides a gain for said WDM signal light;

(d) connecting to said optical amplifying module a booster module having a second pumping source for supporting said gain via an optical connector; and (e) setting an output power from said second pumping source according to the number of channels of said WDM signal light, to obtain a required gain which is outside an adjustable range of said internal pumping source.

34. A method according to claim 33, wherein said step (b) includes the step of maintaining constant the power per channel of said WDM signal light to be supplied to said optical amplifying module.

35. A method according to claim 34, wherein said step (e) comprises the steps of detecting the power of said WDM signal light to be supplied to said optical amplifying module, and obtaining said number of channels according to said power detected.

36. A method according to claim 33, wherein said step (c) comprises the steps of detecting said gain, and controlling the output power from said first pumping source so that said gain detected is maintained constant.

37. A method according to claim 33, wherein said step (e) comprises the steps of predetermining a range of plurality of said number of channels, and deciding a constant output power from said second pumping source for said predetermined range.

38. A method according to claim 33, wherein:

said optical amplifying module further has a doped fiber doped with a rare earth element; and each of said first pumping source and said second pumping source supplying pump light to said doped fiber.

39. A method according to claim 38, wherein said doped fiber comprises an erbium doped fiber.

40. A method according to claim 38, wherein:

said second pumping source comprises first and second laser diodes each for outputting said pump light; and said step (e) comprising the step of selecting either driving one of said first and second laser diodes or driving both of said first and second laser diodes.

41. A method according to claim 38, wherein:

said second pumping source comprises a plurality of laser diodes each for outputting said pump light; and said step (e) comprising the step of setting a drive current for each of said laser diodes.

42. A method according to claim 38, wherein:

said second pumping source comprises a laser diode for outputting said pump light; and said step (e) comprising the step of setting a drive current for said laser diode.

43. A method comprising the steps of:

(a) providing an optical amplifying module having a first pumping source;

(b) supplying signal light to said optical amplifying module;

(c) adjusting an output power from said first pumping source so that said optical amplifying module provides a gain for said WDM signal light;

(d) connecting a booster module having a second pumping source to said optical amplifying module via an optical connector; and (e) setting an output power from said second pumping source according to the power of said signal light to obtain a required gain which is outside the adjustable range of said first pumping source.

44. A method according to claim 43, wherein said signal light comprises WDM signal light obtained by wavelength division multiplexing a plurality of optical signals allocated to different wavelength channels.

45. A method according to claim 43, wherein said step (c) comprises the steps of detecting said gain, and controlling the output power from said first pumping source so that said gain detected is maintained constant.

46. An apparatus comprising:

an optical amplifying module having a first pumping source, to which WDM signal light obtained by wavelength division multiplexing a plurality of optical signals allocated to different wavelength channels is supplied;

an adjusting unit for adjusting an output power from said first pumping source so that said optical amplifying module provides a gain for said WDM signal light; and a booster module having a second pumping source for supporting said gain, said booster module being connectable to said optical amplifying module via an optical connector;

an output power from said second pumping source being set according to the number of channels of said WDM signal light, to obtain a required gain which is outside an adjustable range of said first pumping source.

47. An apparatus according to claim 46, further comprising a feedback loop for maintaining constant the power per channel of said WDM signal light to be supplied to said optical amplifying module.

48. An apparatus according to claim 47, wherein said feedback loop includes a variable attenuator for giving a variable attenuation to said WDM signal light to be supplied to said optical amplifying module.

49. An apparatus according to claim 47, wherein said feedback loop includes a dispersion compensator through which said WDM signal light is passed.

50. An apparatus according to claim 47, further comprising a detector for detecting the power of said WDM signal light to be supplied to said optical amplifying module, said number of channels being obtained according to the power detected by said detector.

51. An apparatus according to claim 46, wherein said booster module further has a setting the output power from said second pumping source according to said number of channels of said WDM signal light.

52. An apparatus according to claim 46, wherein said adjusting unit comprises a gain control circuit for detecting said gain and controlling the output power from said first pumping source so that said gain detected is maintained constant.

53. An apparatus according to claim 52, further comprising a compensating device for compensating the wavelength dependence of said gain.

54. An apparatus according to claim 46, wherein a range of a plurality of said number of channels is predetermined, and a constant output power from said second pumping source is decided for said predetermined range.

55. An apparatus according to claim 46, wherein:
said optical amplifying module further has a doped fiber doped with a rare earth element; and
each of said first pumping source and said second pumping source supplies pump light to said doped fiber.

56. An apparatus according to claim 55, wherein said doped fiber comprises an erbium doped fiber.

57. An apparatus according to claim 55, wherein:
said second pumping source comprises first and second laser diodes each for outputting said pump light; and
said booster module further having a setting circuit for selecting either driving one of said first and second laser diodes or driving both of said first and second laser diodes.

58. An apparatus according to claim 55, wherein:
said second pumping source comprises a plurality of laser diodes each for outputting said pump light; and
said booster module further having a setting circuit for setting a drive current for each of said laser diodes.

59. An apparatus according to claim 55, wherein:
said second pumping source comprises a first laser diode for outputting a first pump light beam having a first polarization plane, and a second laser diode for outputting a second pump light beam having a second polarization plane perpendicular to said first polarization plane; and
said booster module further has a polarization beam splitter for combining said first and second pump light beams to obtain said pump light.

60. An apparatus according to claim 55 wherein:
said second pumping source comprises a first laser diode for outputting a first pump light beam having a first wavelength, and a second laser diode for outputting a second pump light beam having a second wavelength different from said first wavelength; and
said booster module further has a WDM coupler for wavelength division multiplexing said first and second pump light beams to obtain said pump light.

61. A system comprising:
an optical fiber transmission line for transmitting WDM signal light obtained by wavelength division multiplexing a plurality of optical signals allocated to different wavelength channels; and
at least one optical repeater arranged along said optical fiber transmission line;
said optical repeater comprising:
an optical amplifying module having a first pumping source, to which said WDM signal light is supplied;
an adjusting unit for adjusting an output power from said first pumping source so that said optical amplifying module provides a gain for said WDM signal light;
a booster module having a second pumping source for supporting said gain, said booster module being connectable to said optical amplifying module via an optical connector; and
an output power from said second pumping source being set according to the number of channels of said WDM signal light, to obtain a required gain which is outside an adjustable range of said internal pumping source.

62. An apparatus comprising:
a front-stage optical amplifying section and a rear-stage optical amplifying section each for providing a gain to WDM signal light obtained by wavelength division multiplexing a plurality of optical signals allocated to different wavelength channels;
a variable attenuator optically connected between said front-stage optical amplifying section and said rear-stage optical amplifying section;
a circuit for controlling said variable attenuator so that the power per channel of said WDM signal light to be supplied to said rear-stage optical amplifying section is maintained constant; and
a booster module having a pumping source for supporting said gain in said rear-stage optical amplifying section connecting to said rear-stage optical amplifying section via an optical connector, wherein
an output power from said pumping source being set according to the number of channels of said WDM signal light to obtain a required gain different from the gain in said rear-stage optical amplifying section.

63. An apparatus comprising:
a first pumping source for supporting a gain of WDM signal light to be supplied to an optical amplifying module having a second pumping source, said external pumping source being connected to said optical amplifying module via an optical connector; and
an output power from said first pumping source being set in accordance with an increase in power of the signal light, to obtain a required gain different from the gain of WDM signal light supplied to the optical amplifying module.

64. A method comprising:
connecting a booster module having a first pumping source to an optical amplifying module having a second pumping source, wherein said first pumping source supports a gain of WDM signal light to be supplied to said optical amplifying module via an optical connector; and
setting an output power from said first pumping source in accordance with an increase in power of the signal light, to obtain a required gain different from the gain of WDM signal light supplied to the optical amplifying module.

* * * * *